US010929859B2

(12) United States Patent
Zhao et al.

(10) Patent No.: US 10,929,859 B2
(45) Date of Patent: Feb. 23, 2021

(54) SYSTEMS AND METHODS FOR DETERMINING ECONOMIC IMPACT OF AN EVENT WITHIN A GEOGRAPHIC AREA

(71) Applicant: MasterCard International Incorporated, Purchase, NY (US)

(72) Inventors: Michael L. Zhao, New York, NY (US); Nigel Noyes, Irvington, NY (US); Kimberly Ann Purcell, Wilton, CT (US); Todd Christian Lowenberg, Redding, CT (US); Nikhil Anand Malgatti, Ridgefield, CT (US); Harry Chen, Port Chester, NY (US); Shweta Jain Chaudhury, London (GB); Dhruv Akhauri, Haryana (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 666 days.

(21) Appl. No.: 15/368,195

(22) Filed: Dec. 2, 2016

(65) Prior Publication Data

US 2017/0161755 A1 Jun. 8, 2017

Related U.S. Application Data

(60) Provisional application No. 62/262,809, filed on Dec. 3, 2015.

(51) Int. Cl.
*G06Q 30/02* (2012.01)
*G06Q 40/02* (2012.01)

(52) U.S. Cl.
CPC ......... *G06Q 30/0201* (2013.01); *G06Q 40/02* (2013.01)

(58) Field of Classification Search
None
See application file for complete search history.

(56) References Cited

U.S. PATENT DOCUMENTS 6,611,726 B1 * 8/2003 Crosswhite ............. G06F 17/18
700/99
8,417,561 B2 4/2013 Ghosh et al.
(Continued)

*Primary Examiner* — Thomas L Mansfield
(74) *Attorney, Agent, or Firm* — Armstrong Teasdale LLP

(57) ABSTRACT

A method for determining an economic impact of a candidate event includes receiving an event type identifier representing an event type of a candidate event to occur, and building a reference data store including historical transaction data records of payment transactions occurring in reference geographic areas associated with a reference event having the event type identifier. The method also includes generating a reference model from the historical transaction data records the models a reference number of active accounts and active merchants within a reference geographic area during a period of time associated with the reference event occurring in the geographic area. The method further includes determining a predicted number of active accounts and active merchants within the target geographic area using the reference model, and determining a predicted consumer spend using a predicted spend model. The method also includes generating an economic impact report including the consumer spend.

20 Claims, 9 Drawing Sheets

(56) References Cited

U.S. PATENT DOCUMENTS

| | | | |
|---|---|---|---|
| 2003/0061132 A1* | 3/2003 | Yu, Sr. ................ | G06Q 30/02 |
| | | | 705/30 |
| 2009/0240563 A1* | 9/2009 | Sacks .................. | G06Q 10/06 |
| | | | 705/7.36 |
| 2011/0178847 A1* | 7/2011 | Rane ................... | G06Q 30/02 |
| | | | 705/7.31 |
| 2011/0264581 A1 | 10/2011 | Clyne | |
| 2013/0246125 A1* | 9/2013 | DiGioacchino .... | G06Q 30/0201 |
| | | | 705/7.33 |
| 2014/0278770 A1 | 9/2014 | Hardy et al. | |
| 2015/0032586 A1* | 1/2015 | Blackhurst ......... | G06Q 30/0631 |
| | | | 705/35 |
| 2015/0039388 A1* | 2/2015 | Rajaraman ......... | G06Q 30/0613 |
| | | | 705/7.29 |
| 2015/0242869 A1* | 8/2015 | Unser ................. | G06Q 30/0205 |
| | | | 705/7.31 |
| 2015/0317654 A1* | 11/2015 | Unser ................. | G06Q 30/0205 |
| | | | 705/7.34 |
| 2016/0328723 A1 | 11/2016 | Cunnane | |

* cited by examiner

SYSTEMS AND METHODS FOR DETERMINING ECONOMIC IMPACT OF AN EVENT WITHIN A GEOGRAPHIC AREA

CROSS-REFERENCE TO RELATED APPLICATIONS

This application claims to benefit of priority to U.S. Provisional Patent Application No. 62/262,809, filed Dec. 3, 2015, the contents and disclosure of which are hereby incorporated by reference herein in their entirety.

BACKGROUND

The present application relates generally to determining an economic impact of an event within a geographic area, and more particularly, to a network-based system and method for determining an economic impact of an event within a geographic area based upon historical transaction data of a comparable area having experienced a similar such event.

For decades, economists have conducted economic impact studies for various types of potential situations, such as proposed construction projects, new policies, transportation planning, site selections, large events, or even the presence or absence of a particular business or organization (collectively referenced herein as an "event"). These economic impact studies may be heavily relied upon, for example, in a cost-benefit analysis in determining whether an event is initiated, in a municipality offering tax incentives, or in helping to form a particular piece of legislation. Moreover, promoters (or detractors) of a particular proposed event, for example, are known to spend millions of dollars on economic impact studies to help bolster their argument for (or against) the proposed event.

Conventionally, an economist generally conducts an economic impact analysis by collecting (generally publicly available) macroeconomic data for a particular neighborhood or region that may be affected by a proposed event. These types of macroeconomic data may include gross product of the region, export sales, tax revenue, etc. Furthermore, an economist may use this macroeconomic data to devise one or more assumptions in formulating an economic impact model to forecast the resulting impact of a particular proposed event.

However, conventional economic impact analysis remains largely an inexact exercise that is prone to errors. For example, any assumptions relied upon in formulating an economic impact model depend heavily on the particular economist conducting the economic impact analysis. Furthermore, depending on the source (e.g., different government agencies, nonprofit organizations, etc.), macroeconomic data remains largely coarse and generally is insufficiently precise to properly identify positive and/or negative impacts on the economic conditions of an area. Thus, based on conventional techniques, even a seasoned economist requires considerable experience and technical expertise to attempt formulating a sufficiently realistic economic impact model that produces a meaningful economic impact analysis, especially in today's extremely complex economy.

Accordingly, a system is needed that is able to utilize macroeconomic data and more granular real-world, historical transaction data to more precisely determine the economic impact of an event on a geographic area with a greater degree of confidence.

BRIEF DESCRIPTION

In one aspect, a computer-implemented method for determining an economic impact of a candidate event occurring within a target geographic area using historical transaction data is provided. The method is implemented using an economic impact analyzing computing device. The method includes receiving, from a requestor, an area identifier representing the target geographic area and an event type identifier representing an event type of a candidate event to occur within the target geographic area. The method also includes building, at a database in communication with the economic impact analyzing device, a reference data store, the reference data store including historical transaction data records of payment transactions occurring in a plurality of reference geographic areas associated with a reference event having the event type identifier. The method further includes generating a reference model from the historical transaction data records in the reference data store, the reference model modelling at least one of a reference number of active accounts and a reference number of active merchants within a reference geographic area during a period of time associated with the reference event occurring in the corresponding reference geographic area. The method includes determining at least one of a predicted number of active accounts and a predicted number of active merchants within the target geographic area during a period of time associated with the candidate event using the reference model, and determining a predicted consumer spend within the target geographic area over the period of time associated with the candidate event by inputting the at least one of the predicted number of active accounts and the predicted number of active merchants into a predicted spend model. The method still further includes generating an economic impact report for the requestor including at least the determined predicted consumer spend.

In another aspect, an economic impact analyzing computing device for determining an economic impact of a candidate event occurring within a target geographic area using historical transaction data is provided. The economic impact analyzing computing device includes a processor in communication with a memory. The economic impact analyzing computing device is configured to receive, from a requestor, an area identifier representing the target geographic area and an event type identifier representing an event type of a candidate event to occur within the target geographic area. The economic impact analyzing computing device is also configured to build, at a database in communication with the economic impact analyzing device, a reference data store, the reference data store including historical transaction data records of payment transactions occurring in a plurality of reference geographic areas associated with a reference event having the event type identifier. The economic impact analyzing computing device is further configured to generate a reference model from the historical transaction data records in the reference data store, the reference model modelling at least one of a reference number of active accounts and a reference number of active merchants within a reference geographic area during a period of time associated with the reference event occurring in the corresponding reference geographic area. The economic impact analyzing computing device is configured to determine at least one of a predicted number of active accounts and a predicted number of active merchants within the target geographic area during a period of time associated with the candidate event using the reference model, and determine a predicted consumer spend within the target geographic area over the period of time associated with the candidate event by inputting the at least one of the predicted number of active accounts and the predicted number of active merchants into a predicted spend model. The economic impact analyzing computing device is still further configured to generate an economic impact report for the requestor including at least the determined predicted consumer spend.

In yet another aspect, a non-transitory computer-readable storage medium including computer-executable instructions embodied thereon is provided. When executed by an economic impact analyzing computing device including a processor in communication with a memory, the computer-executable instructions cause the economic impact analyzing computing device to receive, from a requestor, an area identifier representing the target geographic area and an event type identifier representing an event type of a candidate event to occur within the target geographic area. The computer-executable instructions also cause the economic impact analyzing computing device to build, at a database in communication with the economic impact analyzing device, a reference data store, the reference data store including historical transaction data records of payment transactions occurring in a plurality of reference geographic areas associated with a reference event having the event type identifier. The computer-executable instructions further cause the economic impact analyzing computing device to generate a reference model from the historical transaction data records in the reference data store, the reference model modelling at least one of a reference number of active accounts and a reference number of active merchants within a reference geographic area during a period of time associated with the reference event occurring in the corresponding reference geographic area. The computer-executable instructions cause the economic impact analyzing computing device to determine at least one of a predicted number of active accounts and a predicted number of active merchants within the target geographic area during a period of time associated with the candidate event using the reference model, and determine a predicted consumer spend within the target geographic area over the period of time associated with the candidate event by inputting the at least one of the predicted number of active accounts and the predicted number of active merchants into a predicted spend model. The computer-executable instructions still further cause the economic impact analyzing computing device to generate an economic impact report for the requestor including at least the determined predicted consumer spend.

In a further aspect, a computer-implemented method for determining an economic impact of a candidate event occurring within a specified geographic area using historical transaction data is provided. The method is implemented using an economic impact analyzing computing device. The method includes receiving, from a requestor, an identifier representing the specified geographic area and a type of candidate event to occur within the specified geographic area and identifying, by the economic impact analysis computing device, at least one comparable geographic area of a plurality of comparable geographic areas that has experienced an event that is of a similar type to the candidate event, each of the plurality of comparable geographic areas being substantially similar to the specified geographic area. The method also includes retrieving, from a transaction database, historical transaction data for the at least one comparable geographic area including a first set of data corresponding to a first period of time that is before the at least one comparable geographic area experienced the event that is of a similar type to the candidate event, and a second set of data corresponding to a second period of time that is after the at least one comparable geographic area experienced the event that is of a similar type to the candidate event. Furthermore, the method includes retrieving, from the transaction database, pre-event data for the specified geographic area, wherein the pre-event data includes historical transaction data for the specified geographic area corresponding to a period of time that is before the candidate event has occurred within the specified geographic area, and comparing the first set of data to the pre-event data, and determining post-event data for the specified geographic area based upon at least (i) the comparisons of the first set of data to the pre-event data and (ii) the second set of data.

DETAILED DESCRIPTION

Figure 1:
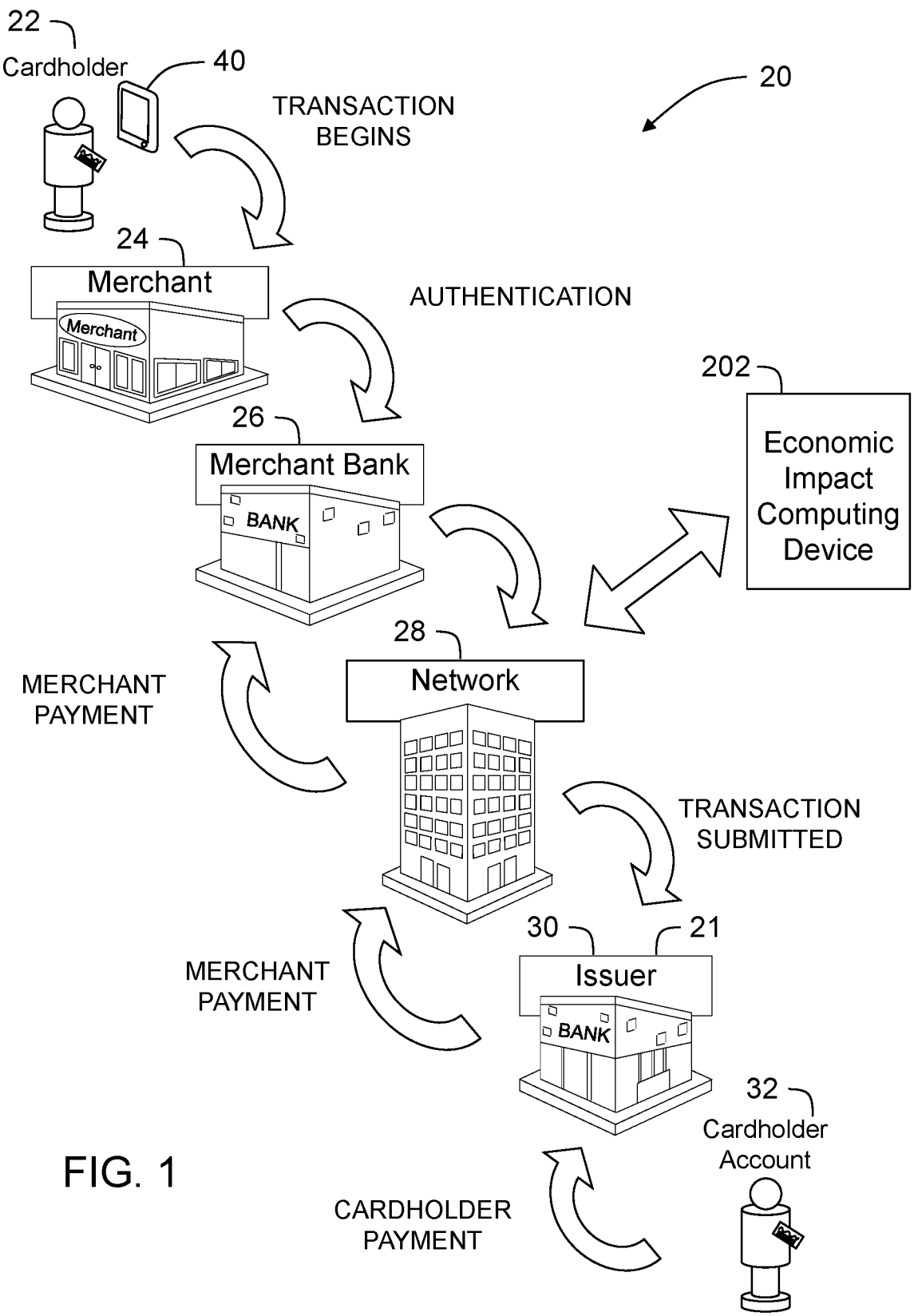
FIG. 1 is a schematic diagram illustrating an example multi-party transaction card industry system for processing payment card transactions and for providing an economic impact analysis in accordance with an example embodiment of the present disclosure.

City planners, businesses, policy planners, and other entities rely on economic impact studies and analyses to assist with determining the potential economic impact of building a new road, building a new plant, creating a new policy, building a new stadium, hosting a major sporting event, etc. (referred to herein as an "event"). However, these economic impact studies are generally conducted by economists who rely on their own subjective assumptions and utilize macroeconomic data from one or more agencies or organizations that may not provide an actual economic impact of any event within a geographic area. According to various aspects described herein, an economic impact analysis system may provide a user a projected economic impact of a hypothetical scenario (i.e., also referred to as a "candidate event" occurring) for a specified geographic area based upon historical transaction data of a group of cardholders. For example, a user may provide a hypothetical scenario or a candidate event, such as the proposed construction of a new sports stadium, to occur within a specified geographic area. In one implementation of the present disclosure, the systems and methods described herein may identify other geographic areas that are comparable to the specified geographic area based on transaction data occurring in each geographic area. Furthermore, the economic impact analysis system may generate economic indicator data for each of the identified comparable geographic areas based on the transaction data corresponding to each of these comparable geographic areas over a particular time period. The economic impact analysis system determines whether each geographic area experienced an occurrence of a scenario or an event that is similar to the hypothetical scenario provided by the user (a "reference event"). The system may generate an overall economic impact determination (e.g., an economic impact report) based on the differences between the economic indicator data associated with the comparable geographic areas that experienced the reference event and the economic indicator data from those comparable geographic areas that did not experience the reference event.

In another implementation of the present disclosure, the systems and methods described herein may generate a reference model based upon the historical transaction data. The reference model is configured to model at least one of a reference number of active accounts and a reference number of active merchants within a reference geographic area (e.g., a geographic area having experienced the same type of event as the candidate event) during a period of time associated with a reference event occurring in the corresponding reference geographic area. The number of active accounts (i.e., a number of payment accounts such as credit accounts, debit accounts, etc.) and active merchants function as economic indicators for an area. For example, if a number of active accounts and/or active merchants is trending upwards or increasing for a geographic area, that geographic area is likely improving economically. The economic impact analysis system receives an area identifier representing the target geographic area (i.e., the geographic area in which the candidate event may occur) and an event identifier representing a type of candidate event to occur within the target geographic area (e.g., large sporting event, new industrial investment, infrastructure spending, new retail construction, etc.). The economic impact analysis system may also receive a period of time of interest to the requestor. The time period may include a length of time before, during, and/or after the occurrence of the reference event (e.g., three months before through nine months after the event). The economic impact analysis system uses the event identifier and period of time as inputs to generate the reference model based upon the historical transaction data associated with geographic areas experiencing the same type of event over the specified period of time.

The economic impact analysis system then employs the reference model to predict a number of active accounts and/or a number of active merchants within the target geographic area for a period of time associated with the candidate event. This period of time includes the occurrence of the event as well as a length of time thereafter (e.g., 3 months, 6, months, 2 years after the event). The economic impact analysis system also generates and employs a predicted spend model to predict a consumer spend (e.g., the amount consumers are spending within a geographic area) within the target geographic area over the period of time associated with the candidate event. In one embodiment, the number of active accounts and/or the number of active merchants in the target geographic area, as predicted using the reference model, are used as inputs to the predicted spend model. The economic impact analysis system generates an economic impact report for an interested party, the report including the determined predicted consumer spend, the predicted number of active accounts, and/or the predicted number of active merchants. The report may include additional and/or alternative information, based upon a request by the interested party.

In these implementations, the reference model is a flexible model that can be adjusted to include and/or account for a variety of variables. In some embodiments, an input variable informs the economic impact analysis system of which subset of historical transaction data records to retrieve (e.g., from a transaction record data store) for the reference model. For example, using the type of event of the candidate event (e.g., the event identifier) causes the economic impact analysis system to retrieve a subset or batch of historical transaction data records for transactions occurring in a reference geographic area that experience the same type of event. Using an input variable representing a length of time following a reference event, such as 15 months, causes the economic impact analysis system to retrieve a subset or batch of historical transaction data records for transactions occurring during the 15 months following a reference event. Using a location attribute of a target geographic area (e.g., "urban") causes the economic impact analysis system to retrieve a subset or batch of historical transaction data records for transactions occurring in reference geographic areas sharing the location attribute. It should be readily understood that the above examples are illustrative only and that any number of variables and combinations thereof may be used in the reference model to refine and/or analyze outputs therefrom.

In addition, in some embodiments, economic impact analyses may be performed for one or more geographic areas adjacent to the target geographic area ("adjacent geographic regions"). More particularly, although the target geographic area (e.g., one particular postcode) may be the precise location of a candidate event, it is understood that events have economic impact on surrounding/adjacent areas (e.g., adjacent/surrounding postcodes). Accordingly, any analyses described herein as being performed on a single target geographic area may be similarly performed on one or more adjacent geographic areas. In some embodiments, such additional analyses associated with adjacent geographic areas are performed automatically. For example, the economic impact analysis system determines one or more adjacent geographic areas and performs the same analyses subsequent to (or concurrently with) performing the analyses associated with the target geographic area. Additionally or alternatively, the reference model described herein may automatically model adjacent geographic area(s). In other embodiments, such analysis of adjacent geographic areas is initiated "manually", such that only adjacent geographic areas of particular interest to a requestor may be analyzed, reducing processing times of the economic impact analysis system and improving bandwidth thereof.

As used herein, the terms "scenario," "event," and "project," refer to any action that may have an economic impact on a specific geographic area, region, or location (e.g., a city, a county, a metropolitan area, a state, a country). For example, a scenario, event, or project may include the building (or proposed building) of a factory, power plant, processing plant, transit infrastructure for goods and/or people (e.g., train lines, highways, airports, etc.), commercial or residential buildings, sports stadiums and infrastructure, or recreational parks. Furthermore, a scenario, event, or project may even refer to an environmental improvement or protection plan for a sports event (e.g., the World Cup™, the Super Bowl®, the Olympics®, etc.). The scenario or event may also include events that may cause a detrimental economic impact to a geographic region, such as a natural disaster, an industrial/environmental disaster, or even a terrorist attack.

According to various examples described herein, an economic impact analysis system is configured to communicate with a payment processor that is in communication with or integral to a payment processing network to retrieve historical transaction data from a payment processor database, to determine economic impact of an event within a geographic area, and to provide an economic impact analysis to a city planner, builder, economic consultant, and/or another requesting entity ("requestor"). The economic impact analysis may include economic impact information that assists city planners, for example, with guidance for smart project planning because the analysis is based upon not only actual historical spending information for a particular geographic region where a proposed project is to be built, but also for comparable regions that may or may not have executed a similar project. For example, an economic impact analysis system may retrieve, from a payment processor, actual transaction data, and may analyze the transaction data to determine a number of active accounts before/after an event, a number of active merchants before/after an event, a consumer spend before/after the event, what merchants are new to the geographic area, or the increase in purchases made by cardholders for a region after a new sports stadium is constructed.

This stored transaction data includes any data associated with transaction that is associated with a debit card, credit card, loyalty card, rewards card, and the like, (collectively a "payment card") and may include any information associated with the transaction, such as item or items purchased, the merchant, the cardholder, and the like. Specifically, each transaction data record includes at least a time of the respective payment transaction, a geographic location of the payment transaction, an account identifier of a payment account associated with the payment transaction, a merchant identifier of a merchant associated with the payment transaction, and a transaction amount of the payment transaction. Account and/or merchant identifiers may not identify actual payment accounts or merchants, respectively, but instead may include "counter" values, such that the identifier identifies the number of accounts or merchants in the geographic area (e.g., "12679" rather than a payment account number (PAN)).

According to various aspects, the economic impact analysis system may model the spending history of a group of cardholders based on geographic location (e.g., all consumers within the geographic location) and/or event type of event occurring in the geographic location. In some implementations, the economic impact analysis system determines comparable geographic regions that are similar or substantially similar to one another. Determining that at least two geographic areas are substantially similar may include any number of statistical or mathematical functions that allow the at least two geographic areas to be statistically compared. Moreover, the spending history of the cardholders of each comparable geographic region may be used by the economic impact analysis engine to determine an economic impact of a candidate event for a specified geographic area based on generated economic indicator data for each comparable geographic area. Additionally or alternatively, determining that geographic areas are similar may include determining location attributes for geographic areas and identifying one or more geographic areas sharing those location attributes. Location attributes may include, for example, population density, classification (e.g., urban, suburban, rural), average income, relative residential/commercial portions, and/or similar descriptive attributes. In some cases, such location attributes may be determined through publically available third-party data (e.g., credit bureau reporting data, census data, etc.).

This transaction data may include many different types of data that may serve as indicators of economic activity or economic impact on a region. These different types of transaction data, such as a date, a time, a merchant involved in the transaction, a merchant category, a transaction location, a transaction dollar amount, etc., may provide valuable indicators of specific industries, merchant brands, merchant locations, spending habits for a particular geographic region, seasonal spending, trade areas, disposable income indicators, commuting or travel patterns, or even an inflow or an outflow of residents in the geographic area, as a few examples. For example, the economic impact analysis system may retrieve historical transaction data from the payment processor database to mathematically determine where a cardholder lives based on the locations of merchants that the cardholder primarily frequents. To further this example, a visitor (opposed to a local cardholder) may be determined from the type and location of merchants the visitor visited over a short period of time. Thus, "economic indicator data" as used herein may include information on whether a cardholder is a local resident or a visitor to a specified geographic region. These economic indicators can in turn be utilized by the economic impact analysis system in determining the overall economic impact of an event to a specific geographic region or location.

A payment transaction typically includes an authorization process, a settlement process, and clearing process. During the authorization, an initial payment amount is processed to determine whether the cardholder has sufficient funds to cover the initial payment amount. At this point, a financial entity processing the transaction, for example, a payment processor, a bank, and the like, may receive data about the transaction such as merchant name, purchase amount, and the like. This data is referred to as authorization data. In some cases, authorization data may be generated but the transaction may not be completed for a variety of reasons including in those cases where the cardholder has insufficient funds to cover the transaction. In an example embodiment, the economic impact analysis system is configured to use authorization data as well as transaction data when analyzing the economic impact of an event within a geographic area.

Different types of entities may interface with a user of the economic impact analysis system (referred to herein as the "analyzer") to obtain desired types of economic impact data. For example, government agencies, lobbyists, banks, businesses, environmental organizations, non-governmental organizations, or any interested party may desire to utilize the economic impact analysis system to help project economic impact (i.e., generate economic impact data) for any number of potential events that may occur. Furthermore, the economic impact analysis system may provide these interested groups specific economic impact data, such as variables or parameters, that better quantify or qualify the economic impact of a proposed scenario or event. For example, a municipality may utilize the economic impact analysis system to determine the economic impact of a proposed project on various economic indicators, such as the change in income tax or sales tax revenue, the socioeconomic impact to the local economy, the number of business openings or closings, the increase (or decrease) in population for the specified geographic area, the cost and time to recover funds invested into the proposed project, the increase (or decrease) in number of visitors to the geographic region, the amount of increase (or decrease) in trade with neighboring regions, or any other suitable economic indicator.

Moreover, because the economic impact analysis system may utilize historical transaction data from groups of cardholders, more precise and meaningful statistical analyses can be performed during the economic impact analyses. Specifically, a confidence interval may be determined by the economic impact analysis system based on the levels of variance in the historical transaction data. For example, higher levels of variance in the historical transaction data may indicate a greater confidence interval, which generally indicates less uncertainty for the overall determined economic impact for a specific proposed scenario or event. Thus, with the use of historical transaction data, the economic impact analysis system can provide an analyzer with not only quantifiable changes to a local economy based upon statistical analysis on the historical transaction data, but also can estimate, at a specific degree of confidence, the increase in tax revenue, etc. that a particular proposed project could provide into the local municipality.

The methods and systems described herein may be implemented using computer programming or engineering techniques including computer software, firmware, hardware or any combination or subset thereof, to perform at least one of the following steps: (a) receiving, from a requestor, an area identifier representing the target geographic area and an event type identifier representing an event type of a candidate event to occur within a target geographic area; (b) building, at a database, a reference data store, the reference data store including historical transaction data records of payment transactions occurring in a plurality of reference geographic areas associated with a reference event having the event type identifier; (c) generating a reference model from the historical transaction data records in the reference data store, the reference model modelling at least one of a reference number of active accounts and a reference number of active merchants within a reference geographic area during a period of time associated with the reference event occurring in the corresponding reference geographic area; (d) determining at least one of a predicted number of active accounts and a predicted number of active merchants within the target geographic area during a period of time associated with the candidate event using the reference model; (e) determining a predicted consumer spend within the target geographic area over the period of time associated with the candidate event by inputting the at least one of the predicted number of active accounts and the predicted number of active merchants into a predicted spend model; and (f) generating an economic impact report for the requestor including at least the determined predicted consumer spend. The methods and systems may additionally or alternatively be implemented to perform at least one of the following steps: (g) receiving, from a requestor, an identifier representing the specified geographic area and a type of candidate event to occur within the specified geographic area; (h) identifying, by the economic impact analysis computing device, at least one comparable geographic area of a plurality of comparable geographic areas that has experienced an event that is of a similar type to the candidate event, each of the plurality of comparable geographic areas being substantially similar to the specified geographic area; (i) retrieving, from a transaction database, historical transaction data for the at least one comparable geographic area including a first set of data corresponding to a first period of time that is before the at least one comparable geographic area experienced the event that is of a similar type to the candidate event, and a second set of data corresponding to a second period of time that is after the at least one comparable geographic area experienced the event that is of a similar type to the candidate event; (j) retrieving, from the transaction database, pre-event data for the specified geographic area, wherein the pre-event data includes historical transaction data for the specified geographic area corresponding to a period of time that is before the candidate event has occurred within the specified geographic area; (k) comparing the first set of data to the pre-event data; and (l) determining post-event data for the specified geographic area based upon at least (1) the comparisons of the first set of data to the pre-event data and (2) the second set of data.

By performing these steps, the systems are configured to solve a problem in computer networking and in determining an economic impact of a candidate event on a target geographic area by enabling analysis of the actual spending habits of cardholders in disparate geographic areas to provide insight into potential economic impact(s) on the target geographic area. As described herein, historical transaction data associated with cardholders of one or more geographic areas is not available to outside parties. As such, determining an economic impact of a hypothetical event occurring within a specified geographic area based on the analysis of historical transaction data cannot be performed without the technical solution herein described. Moreover, historical transaction data provides a wealth of data points—with millions of transactions records available, there is virtually no limit to the variable(s) and combinations thereof that can be modelled using historical transaction data. In addition, the vast amount of data available for modelling enables automated modelling in a way that was not available in known systems that are limited to using much less granular public and/or purchased data, as these known systems oftentimes require manual or subjective modelling to determine and/or analyze any trends. As such, the systems and methods described herein enable fully electronic input, analysis, and output, making the prediction functionality of the economic impact analysis system available via a website or a software application (e.g., via an API) in a much shorter amount of time (e.g., only the time needed to automatically process the data against requestor inputs is needed).

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing payment transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system 20 for processing payment-by-card transactions that is in communication with an economic impact analysis computing device 202. Payment card system 20 includes payment network 28 (also referred to as an "interchange" or "interchange network"). Payment network 28 could be the MasterCard® payment card network. MasterCard® payment card network is a proprietary communications standard promulgated by MasterCard International Incorporated® for the exchange of payment transaction data between financial institutions that are members of MasterCard International Incorporated®. (MasterCard is a registered trademark of MasterCard International Incorporated located in Purchase, N.Y.).

In payment card system 20, a financial institution such as an issuer 30 issues a payment account card, such as a credit card account or a debit card account, to a cardholder 22, who uses the payment account card to tender payment for a purchase from a merchant 24. To accept payment with the payment account card, merchant 24 must normally establish an account with a financial institution that is part of the financial payment system. This financial institution is usually called the "merchant bank" or the "acquiring bank" or "acquirer bank" or simply "acquirer". When a cardholder 22 tenders payment for a purchase with a payment account card (also known as a financial transaction card), merchant 24 requests authorization from acquirer 26 for the amount of the purchase. The request may be performed over the telephone, but is usually performed through the use of a point-of-interaction terminal, which reads the cardholder's account information from the magnetic stripe on the payment account card and communicates electronically with the transaction processing computers of acquirer 26. Alternatively, acquirer 26 may authorize a third party to perform transaction processing on its behalf. In this case, the point-of-interaction terminal will be configured to communicate with the third party. Such a third party is usually called a "merchant processor" or an "acquiring processor."

Using payment network 28, the computers of acquirer 26 or the merchant processor will communicate with the computers of issuer 30, to determine whether the cardholder's account 32 is in good standing and whether the purchase is covered by the cardholder's available credit line or account balance. Based on these determinations, the request for authorization will be declined or accepted. If the request is accepted, an authorization code is issued to merchant 24.

When a request for authorization is accepted, the available credit line or available balance of cardholder's account 32 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, the cardholder's account 32 is decreased. Normally, a charge is posted immediately to cardholder's account 32. The bankcard association then transmits the approval to the acquiring processor for distribution of goods/services, or information or cash in the case of an ATM.

After a transaction is captured, the transaction is settled between merchant 24, acquirer 26, and issuer 30. Settlement refers to the transfer of payment data or funds between the merchant's account, acquirer 26, and issuer 30 related to the transaction. Usually, transactions are captured and accumulated into a "batch," which is settled as a group.

Figure 2:
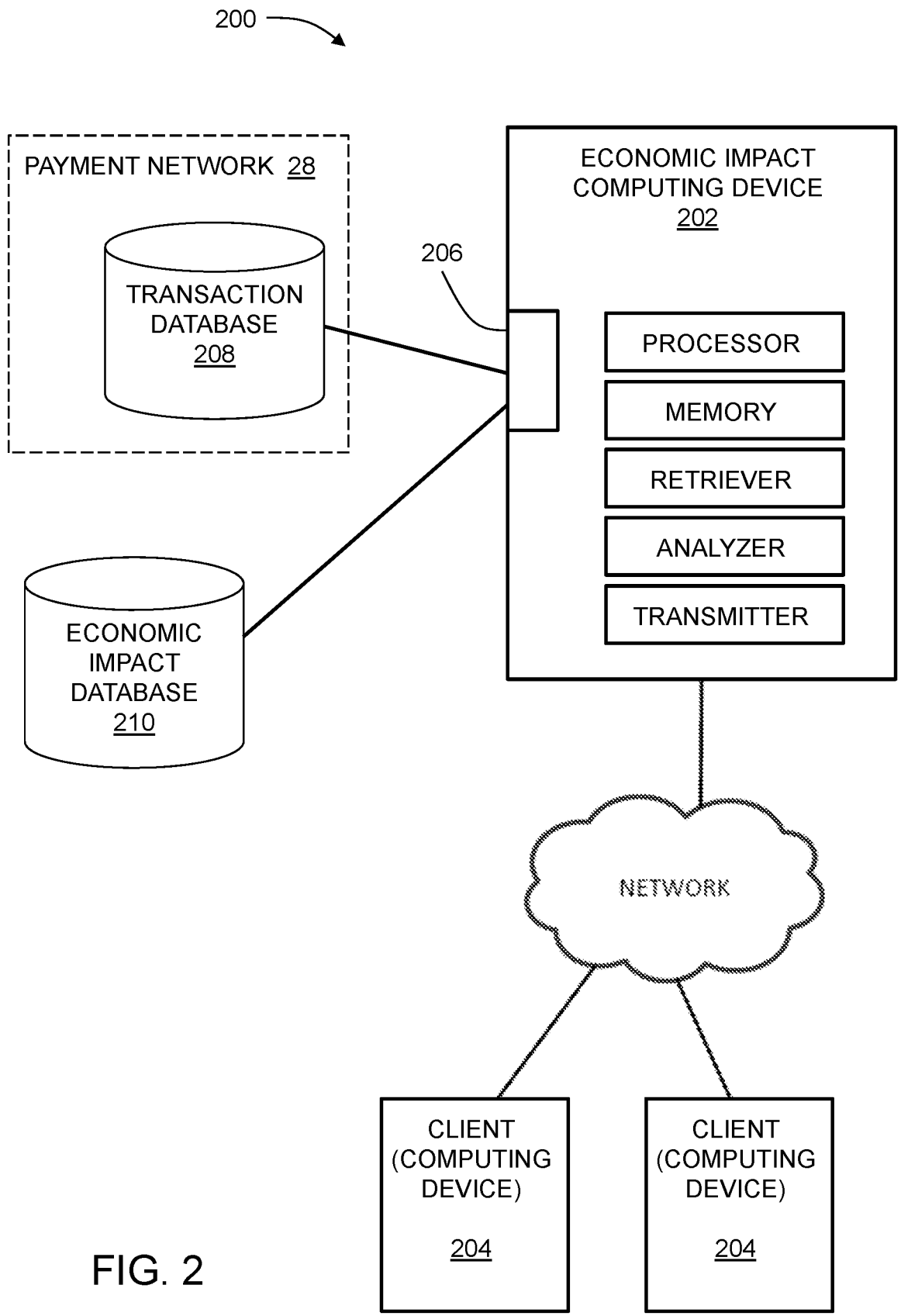
FIG. 2 is a simplified block diagram of an example economic impact analysis system including a plurality of computing devices in accordance with one example embodiment of the present disclosure.

FIG. 2 is a simplified block diagram of an example economic impact analysis system 200 in accordance with one embodiment of the present disclosure. In the example embodiment, system 200 includes economic impact computing device 202 (e.g., a server) and a plurality of client subsystems, also referred to as client systems 204 or client computing devices, connected to economic impact computing device 202. In one embodiment, client systems 204 are computers including a web browser, such that economic impact computing device 202 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client devices 204 may be any device capable of interconnecting to the Internet including a web-based phone, personal digital assistant (PDA), or other web-connectable equipment. A database server 206 is communicatively coupled to an economic impact database 210 and to a transaction database 208 containing transaction data as described above in greater detail.

In one embodiment, transaction database 208 is stored on economic impact computing device 202 and may be accessed by potential users at one of client systems 204 by logging onto economic impact computing device 202 through one of client systems 204. For example, a requestor may utilize one of client systems 204 to input certain variables associated with a target geographic area (e.g., an area identifier or a location identifier, such as a postcode or latitude-longitude GPS coordinates) and with a candidate event (e.g., an event identifier representing a type of candidate event) into a website and/or client application ("app," available via an API). The variables are transmitted to economic impact computing device 202 for the analysis (e.g., modelling) described herein. Additionally, economic impact computing device 202 may generate output (e.g., an economic impact report) and make the output available to the requestor via client system 204, over the website and/or client application.

In any alternative embodiment, transaction database 208 is stored remotely from economic impact computing device 202 and may be non-centralized. Economic impact computing device 202 may include a processor, a memory, a retriever, an analyzer, and a transmitter. The economic impact computing device 202 may include additional components not shown, or less than the amount of components shown.

The retriever may obtain transaction data or economic indicator data from either or both of transaction database 208 or economic database 210. For example, the retriever may receive transaction data associated with a particular geographic area along with economic indicator data associated with another geographic area, etc. The analyzer may process and analyze the retrieved transaction data and the economic indicator data. The transmitter may provide the overall economic impact to client computing device 204.

The economic impact database 210 may include third party economic data that may be public available or available for purchase. This third party economic data may include data that economists traditionally rely upon in obtaining macroeconomic data for their analyses. The economic impact database 210 may include types of data, such as gross domestic product for multiple jurisdictions, unemployment rates for different jurisdictions, inflation rates of different currencies, interest rates for different countries and financial entities and their respective financial products, liquidity rates, stock market indices for various stock markets, foreign exchange rates, tax rates for different jurisdictions, tax revenues for different jurisdictions, bond rates, property values, income distributions for different jurisdictions, education levels and school test scores of a particular population, literacy rates, age distributions, morality rates, crime rates, air/water/noise pollution levels, traffic congestion, percentage of developed land for a particular region, governmental budgets per capita, or any other suitable economic variable that could be used by the economic impact analysis system.

Payment card transaction data from merchants, including merchant account numbers, merchant locations, merchant names, transaction amounts, and transaction dates, is stored within database 208. In addition, model merchant data, including merchant types (e.g., merchant type classification codes), geographic information, demographic information, and attributes of cardholders who have purchased goods or services from the merchants are stored in database 208. Further, a location model maybe stored within database 208.

Figure 3:
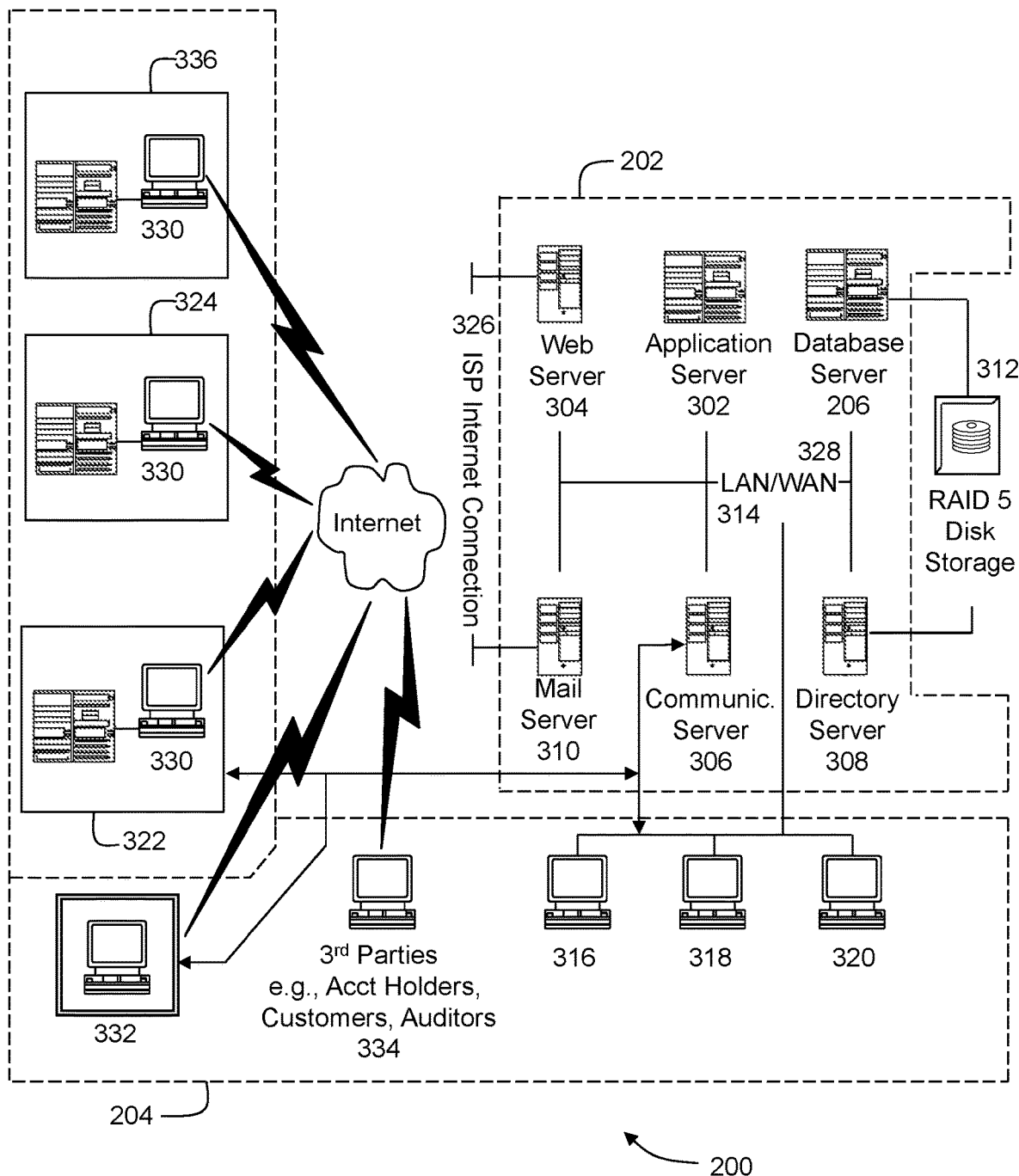
FIG. 3 is an expanded block diagram of an example embodiment of a server architecture of the economic impact analysis system including the plurality of computing devices in accordance with one example embodiment of the present disclosure.

FIG. 3 is an expanded block diagram of an example embodiment of a server architecture of economic impact analysis system 200 in accordance with one embodiment of the present disclosure. Economic impact analysis system 200 includes economic impact computing device 202 and client systems 204. Economic impact analysis computing device 202 further includes database server 206, an application server 302, a web server 304, a communication server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet. For example, one of the workstations 320 may include the payment processor 336 and respective payment processing database.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Economic impact computing device 202 is configured to be communicatively coupled to various entities, including acquirers 322 and issuers 324, and to third parties, e.g., auditors, 334 using an Internet connection 326. Economic impact computing device 202 is also communicatively coupled with a payment processor 336. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 200. At least one of the client systems includes a manager workstation 332 located at a remote location. Workstations 330 and 332 include personal computers having a web browser. Also, workstations 330 and 332 are configured to communicate with economic impact computing device 202. Furthermore, communication server 306 communicates with remotely located client systems, including a client system 332, using a telephone link. Communication server 306 is configured to communicate with other client systems 316, 318, and 320 as well.

Figure 4:
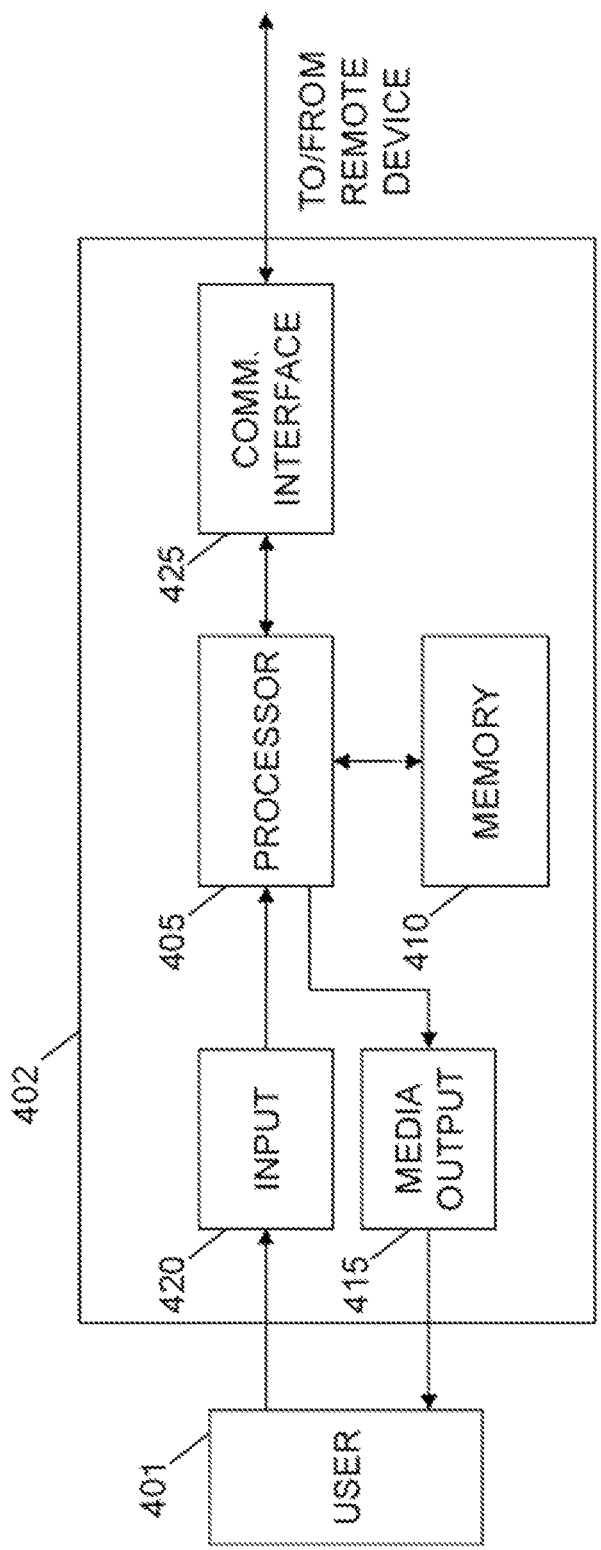
FIG. 4 illustrates an example configuration of a client system shown in FIGS. 2 and 3.

FIG. 4 illustrates an example configuration of a requester computing device 402 operated by a requestor 401 (i.e., user) whom may desire to transmit a request to the economic impact computing device 202. Requester computing device 402 may include, but is not limited to, client systems ("client computing devices") 204, 316, 318, and 320, workstation 330, and manager workstation 332 (shown in FIG. 3).

Requester computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Requester computing device 402 also includes at least one media output component 415 for presenting information to cardholder 401. Media output component 415 is any component capable of conveying information to cardholder 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, requester computing device 402 includes an input device 420 for receiving input from cardholder 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Requester computing device 402 may also include a communication interface 425, which is communicatively couplable to a remote device such as economic impact computing device 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to cardholder 401 via media output component 415 and, optionally, receiving and processing input from input device 420. A user interface may include, among other possibilities, a web browser and client application. Web browsers enable cardholders, such as cardholder 401, to display and interact with media and other information typically embedded on a web page or a website from economic impact computing device 202 or a web server associated with a merchant. A client application allows cardholder 401 to interact with a server application from economic impact computing device 202 or a web server associated with a merchant.

Figure 5:
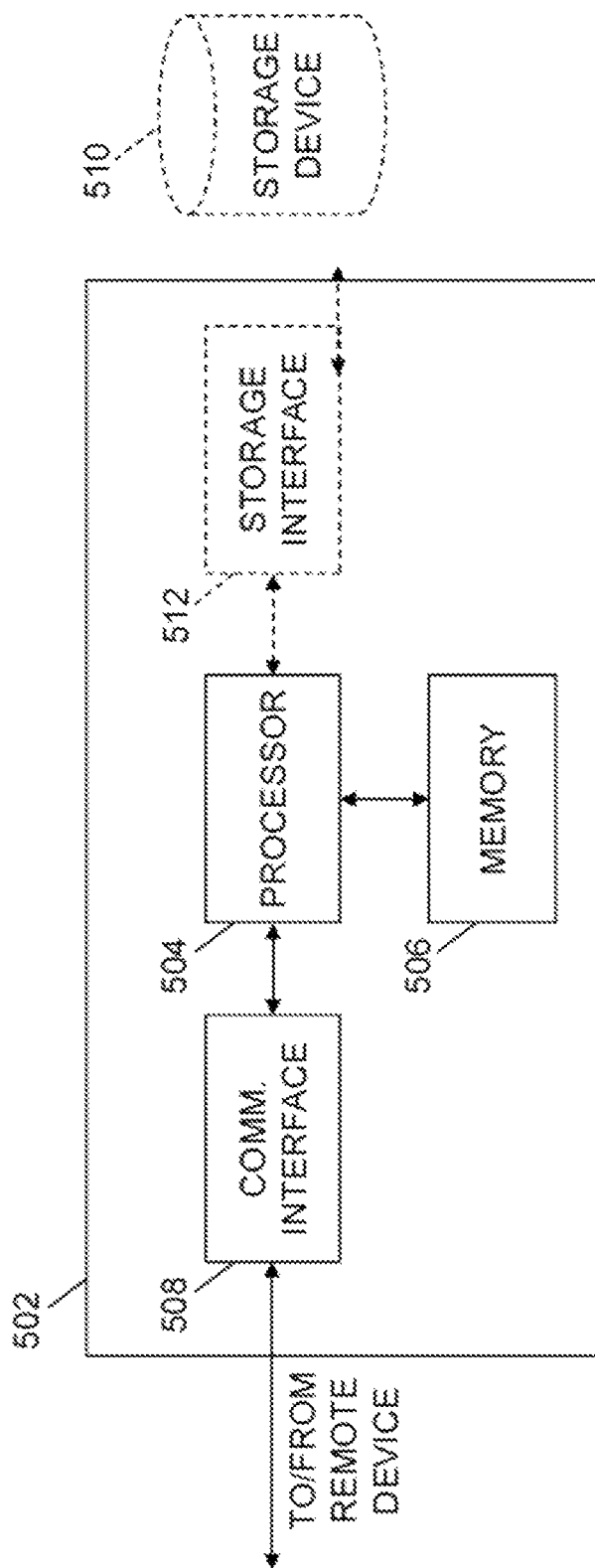
FIG. 5 illustrates an example configuration of a server system shown in FIGS. 2 and 3.

FIG. 5 illustrates an example configuration of an economic impact computing device 502 such as economic impact computing device 202 (shown in FIGS. 2 and 3). Economic impact computing device 502 may include, but is not limited to, database server 206, application server 302, web server 304, communication server 306, directory server 308, and mail server 310.

Economic impact computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that economic impact computing device 502 is capable of communicating with a remote device such as requester computing device 402 or another economic impact computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in economic impact computing device 502. For example, economic impact computing device 502 may include one or more hard disk drives as storage device 510. In other embodiments, storage device 510 is external to server computing device 502 and may be accessed by a plurality of economic impact computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
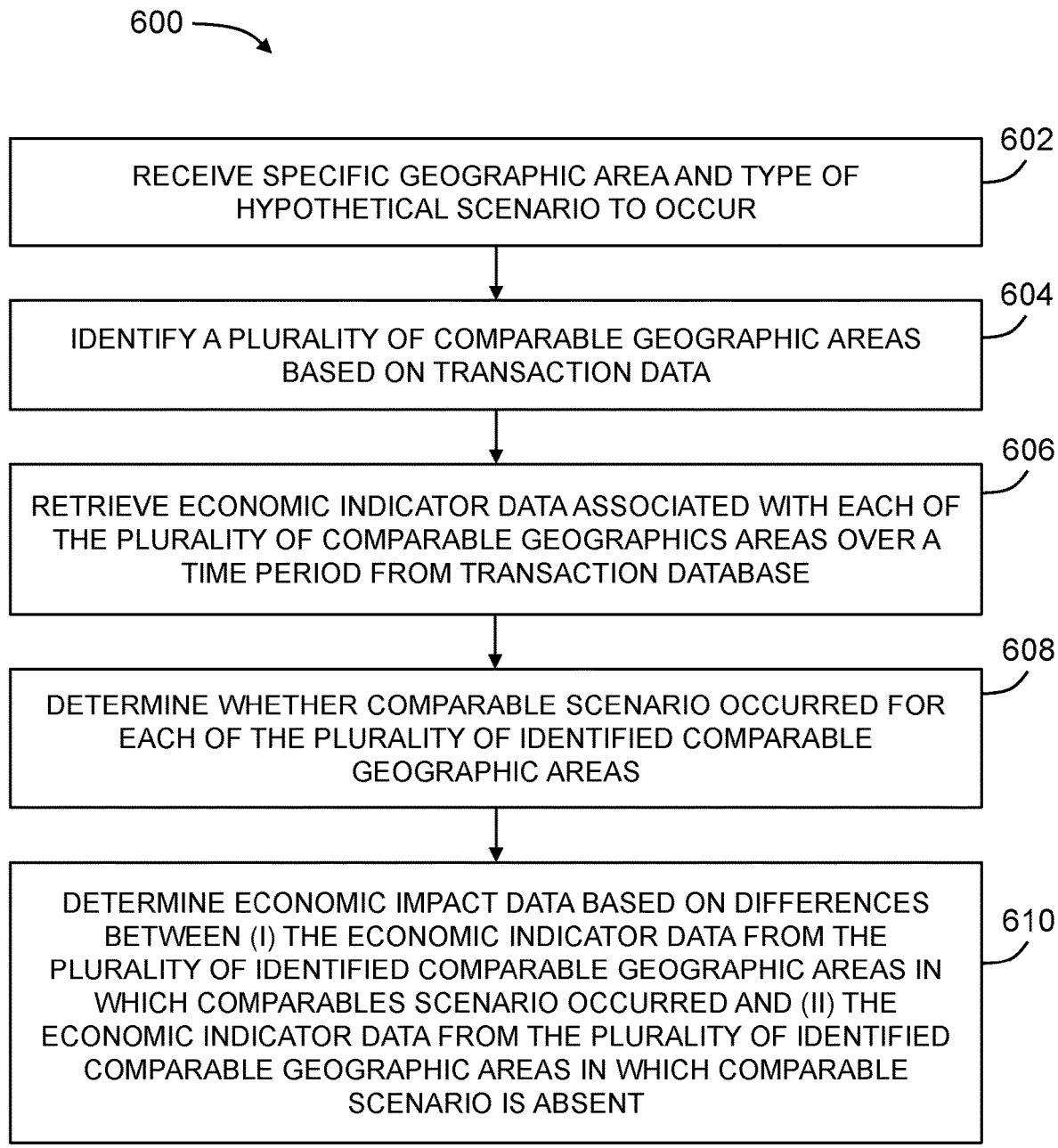
FIG. 6 is a flowchart of an example process that may be performed by the economic impact analysis system of FIGS. 2 and 3 for providing economic impact data of an event occurring within a geographic area and based upon historical transaction data.

FIG. 6 is a flowchart of an example process 600 for providing economic impact data based on a hypothetical scenario occurring within a geographic area and using historical transaction data. Similarly as described above, the hypothetical scenario may include events such as, building a new power plant, constructing a new mass transit line, instituting a new local ordinance, opening a new factory, etc. in a particular geographic area. Process 600 may be performed by economic impact analysis system 200. Initially, economic impact computing device 202 receives 602 a specified geographic area and a type of candidate event from a user (i.e., a requestor). The economic impact analysis system 200 stores transaction data associated with the specified geographic area and identifies 604 other comparable geographic areas that are similar to the specified geographic area based on the retrieved transaction data. For example, the population base, size of the economy, etc. of the specified geographic area may be determined from the retrieved transaction data. The economic impact analysis system 200 retrieves 606 economic indicator data associated with each of the identified comparable geographic areas over a period of time. The period of time can be tailored specifically to each geographic area. For example, if one comparable geographic area built a stadium in 1995 and another geographic area built a stadium in 2012, the relevant time period to analyze transaction data is different for these two geographic areas because of the difference in timing of when the stadium construction occurred. The economic impact analysis system 200 may adjust the relevant economic data for the two (or more) different geographic areas according to a respective timeframe when a particular event occurred for a respective geographic area. For example, the relevant economic data for each geographic area may be adjusted according to inflation, economic trends, cost of living factors, import/export data, economic anomalies (e.g., natural disaster, oil boom, etc.), or any other relevant factors that may affect the economic activity of a particular geographic area.

The economic impact analysis system 200 may determine 608, for each identified comparable geographic area, whether an event or a scenario occurred (for that specific comparable geographic area) that is of the same type of a similar type as the received type of hypothetical scenario. After grouping the comparable geographic areas into two groups (one group in which the scenario occurred and one group where the scenario did not occur (i.e., a control group)), the economic impact analysis system 200 may compare or determine 610 the differences between the two groups of comparable geographic areas. In performing this comparison, the economic impact analysis system 200 may generating and provide the resulting economic impact data to the user. This resulting economic impact data may be provided in any format, such as in a report generated by the economic impact analysis system 200. Alternatively, the economic impact analysis system 200 may allow the user to interact via a website-based report. In this example, the user may log into a secure website and view all the resulting economic impact data via web browser. Continuing this example, the economic impact analysis system 200 may allow the user to view a web-based interactive map that may include user-selectable overlays that detail and convey the resulting economic impact data visual. For example, different colors could be overlaid the specified geographic area, each color denoting a different granular level of detail (e.g., tax revenue percentage increase). Alternatively, the economic impact analysis system 200 may provide slider bars, toggle buttons, etc. for the user to interact with the parameters of the economic impact data provided.

Figure 7:
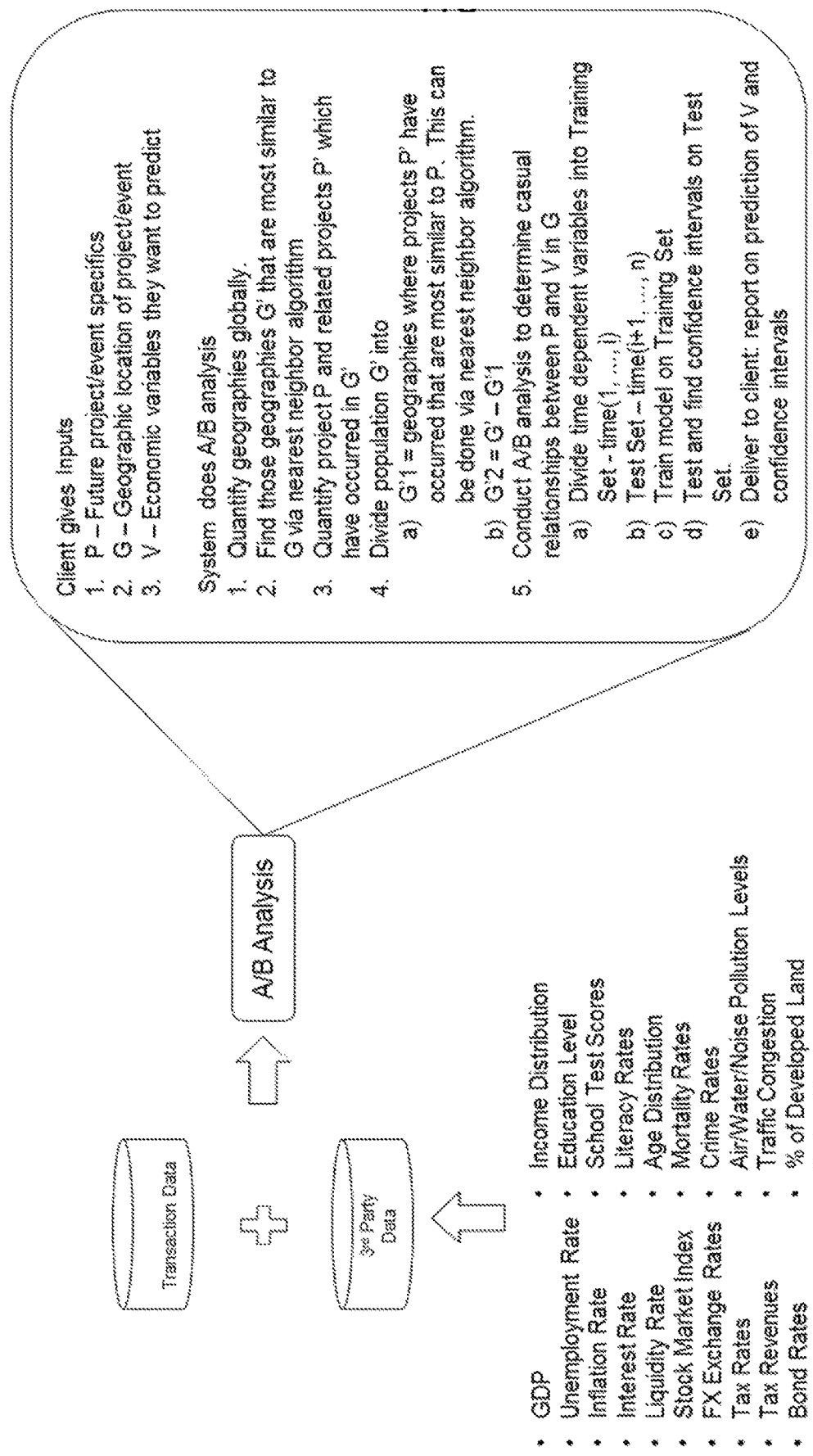
FIG. 7 is a flowchart of an example process that may be performed by the economic impact analysis system of FIGS. 2 and 3 for providing an economic impact analysis of an event occurring within a geographic area and based upon historical transaction data.

FIG. 7 is a flowchart that includes exemplary third party economic data used in this particular economic impact analysis process. For example, the transaction data and third party economic data are utilized in an A/B analysis performed by the economic impact analysis system 200. Similarly, as discussed above, the A/B analysis includes categorizing comparable geographic areas into two groups: comparable geographic areas that include the occurrence of a similar scenario to the hypothetical scenario and comparable geographic areas that do not include the occurrence of a similar scenario. The economic indicator data of each group is analyzed and an economic impact data is generated that predicts the economic impact of the hypothetical scenario on a specified geographic area. As shown in FIG. 7, training sets and time intervals may be used in determining one or more analyses and corresponding confidence intervals.

Figure 8:
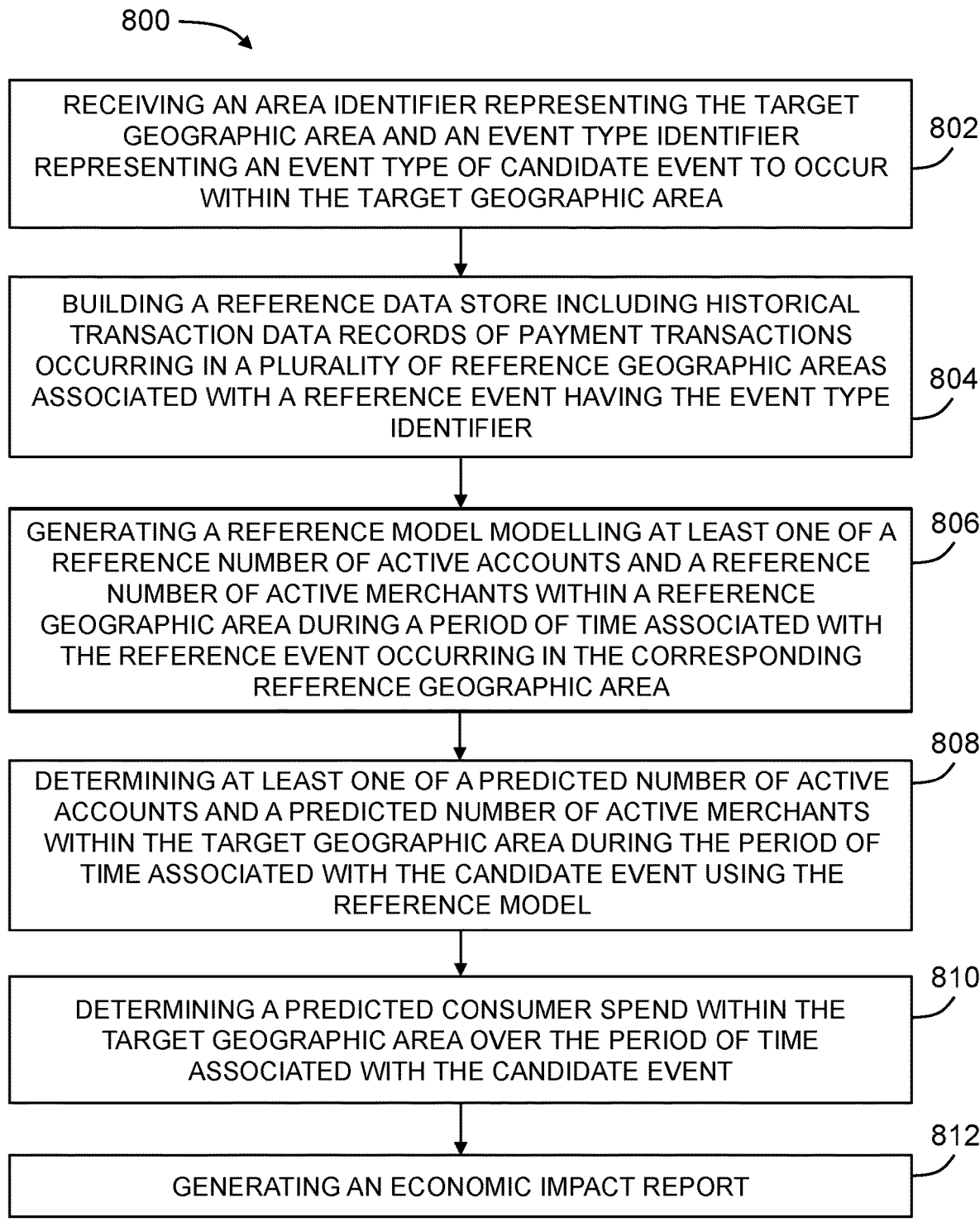
FIG. 8 is a flowchart of an example process that may be performed by the economic impact analysis system of FIGS. 2 and 3 for determining an economic impact of a candidate event occurring within a target geographic area using historical transaction data.

FIG. 8 is a flowchart of an example process 800 for determining an economic impact of a candidate event occurring within a target geographic area using historical transaction data, in accordance with one embodiment of the present disclosure. The steps of process 800 may be implemented using economic impact analysis system 200, specifically using economic impact computing device 202 (both shown in FIG. 2).

In the example embodiment, process 800 includes receiving 802 an area identifier representing the target geographic area and an event type identifier representing an event type of candidate event to occur within the target geographic area. In some embodiments, additional information is provided by a requestor, such as particular adjacent geographic areas of interest, a period of time for which the requestor is interested in seeing predictions (e.g., 6 months after the candidate event, 9 months after the candidate event, etc.), one or more location attributes, one or more additional or alternative event identifiers of additional or alternative candidate events, and/or any other information. Information may be provided by a requestor "manually," such as in writing, over the phone (e.g., spoken, to a person that will manually enter the information into economic impact computing device 202 or directly to economic impact computing device 202), and/or otherwise not in an electronic format. Additionally or alternatively, information may be provided electronically, such as within a form on a website or within a client application maintained by economic impact analysis system 200 and accessed by the requestor using a client computing device 204 (shown in FIG. 2).

Process 800 also includes building 804 a reference data store, the reference data store including historical transaction data records of payment transactions occurring in a plurality of reference geographic areas associated with a reference event having the event type identifier. The reference data store may be stored, for example, in one of transaction database 208 and economic impact database 210 (both also shown in FIG. 2). In some embodiments, building 804 includes storing historical transaction data records, each historical transaction data record including at least, but not limited to, a time of the respective payment transaction, a geographic location of the payment transaction, an account identifier of a payment account associated with the payment transaction, a merchant identifier of a merchant associated with the payment transaction, and a transaction amount of the payment transaction. The geographic location of a payment transaction may be represented using a postcode, a latitude-longitude GPS coordinate, an IP address (in the case of online or virtual transactions), and/or using any other geographic location identifier.

Process 800 also includes generating 806 a reference model from the historical transaction data records in the reference data store. The reference model models at least one of a reference number of active accounts and a reference number of active merchants within a reference geographic area during a period of time associated with the reference event occurring in the corresponding reference geographic area.

In some embodiments, economic impact computing device 102 associates one or more reference event(s) with each transaction record within the reference data store to identify those transaction records used to generate 806 the reference model. A reference event may be associated with transaction record(s) that occurred during a period of time associated with the event (e.g., during event occurrence or during a length of time after the event occurred).

In some embodiments, building 802 the reference data store includes retrieving a subset of the historical transaction data records occurring in the reference geographic area for a period of time including the reference event and following the reference event, wherein the reference event has is the same event type identifier as the candidate event. In such embodiments, generating 804 the reference model includes generating 802 a reference model that may only model against a subset of all the transaction records in the reference data store, the subset including only transaction records associated with events of the same type as the candidate event.

Additionally or alternatively, economic impact computing device 102 generates an event table and stores the event table (e.g., in one of transaction database 208 and economic impact database 210). The event table identifies a plurality of reference events that have occurred and associates those reference events with event type identifiers (e.g., a value of "50" represents a large sporting event, a value of "5" represents an infrastructure project, etc.). Each reference event is also associated with a location (e.g., a postcode, latitude-longitude GPS coordinates, etc.). Reference events may further be associated with dates and/or date ranges. For example, the Olympics® may be associated with a date range that begins at the onset of the games and extends until the end of the games. When a requestor provides the event type identifier of the candidate event, economic impact computing device 102 inputs the event type identifier to the event table to determine locations and dates of the reference events sharing the same event type identifier. Economic impact computing device 102 then applies those locations and dates to the reference data store to identify a particular subset of historical transaction data records with which to generate a reference model. Additional data elements (e.g., columns) may be added to the event table to account for additional and/or alternative variables for retrieving subset(s) of historical transaction data records from the reference data store, including location attributes, temporary vs. permanent event identifiers, ongoing vs. one-time events, demographic variables, and/or any other variable.

In some embodiments, the event table is populated with events associated with particular requests. For example, if a request for economic impact data associated with the construction of a new shopping mall is received, the event table is populated with similar events (e.g., construction of large shopping centers). In other embodiments, the event table is pre-populated with all event types and is filterable according to event type. The event table may be populated automatically, for example, using a web crawler configured to search for events using particular key words. The event table may additionally or alternatively be populated manually (e.g., a user may manually enter event details for one or more events).

In some embodiments, building 802 the reference data store includes determining at least one location attribute of the target geographic area, and retrieving a subset of the historical transaction data records occurring in at least one reference geographic area that shares the at least one location attribute for a period of time including the reference event and following the reference event. In such embodiments, generating 804 the reference model includes generating 802 a reference model that may only model against a subset of the transactions records including only transaction records of transactions occurring within a reference geographic area sharing one or more location attributes with the target geographic area. Accordingly, it should be understood that the reference data store may be iteratively build 802 and/or filtered, and/or that the reference model may be iteratively generated 804 and/or updated during the analyses described herein, in order to model information with increased relevance to the target geographic area.

In some embodiments, economic impact computing device 102 also builds a model data store as part of the generation 806 of the reference model. Economic impact computing device 102 uses the model data store to store actual reference numbers of active accounts and active merchants within the reference geographic area(s) having the same event type identifier. One example of the model data store is illustrated in Table 1 below.

TABLE 1

Model Data Store

| postcode | time | AA | AM | Event 1 | ... | Event E | Distance from event 1 | ... | Distance from event E | Comments |
|---|---|---|---|---|---|---|---|---|---|---|
| NG2 7 | 201501 | 12345 | 321 | 0 | | 0 | 5 | | 150 | No events active anywhere |
| NG2 7 | 201502 | 12354 | 324 | 1 | | 0 | 5 | | 150 | Event 1 starts in February 2015 in a postcode 5 miles away |
| NG2 7 | 201503 | 12378 | 354 | 1 | | 0 | 5 | | 150 | Event 1 still ongoing |
| NG2 7 | 201504 | 12354 | 357 | 0 | | 1 | 5 | | 150 | Event 1 has completed, event E is now 150 miles away |
| NG2 7 | 201505 | 12430 | 370 | 0 | | 1 | 5 | | 150 | Event E ongoing |
| NG2 7 | 201505 | 12430 | 370 | 0 | | 1 | 5 | | 150 | Event E ongoing |
| ... | | | | | | | | | | |
| NG2 8 | 201501 | 500 | 20 | 0 | | 0 | 0 | | 140 | No events active anywhere |
| NG2 8 | 201502 | 1000 | 50 | 1 | | 0 | 0 | | 140 | Event 1 starts in February 2015 in the same postcode |
| ... | | | | | | | | | | |

As illustrated in Table 1, economic impact computing device 102 stores a record of the reference number of active accounts and active merchants for each month, for each location associated with the same event type (i.e., Event 1, Event E). Economic impact computing device 102 may actively generate the model data store as economic impact computing device 102 analyzes historical transaction data records from the reference data store. Moreover, the model data store may be maintained during and after generating 804 the reference model and using the reference model to make predictions. For example, economic impact computing device 102 can add computed data to the model data store if a longer period of time surrounding the reference event is requested (e.g., 3 months before the event through 12 months after the event), and/or may delete computed data from the model data store if a shorter period of time surrounding the reference event is requested (e.g., only 3 months after the event).

Process 800 includes determining 808 at least one of a predicted number of active accounts and a predicted number of active merchants within the target geographic area during the period of time associated with the candidate event using the reference model. In some embodiments, the reference model may include one or more formulas to predict a number of active accounts and/or a number of active merchants in the target geographic area based upon the historical transaction data records in the reference data store (and/or particular subsets thereof). For example, in one embodiment, the reference model includes the following equations:

$$AA_t = \alpha + \beta * AA_{t-1} + \gamma * SD_t + \delta * E_{t-1} + \theta * e^{\mu + \rho * D_{t-1}} \quad (1),$$

and $$AM_t = \alpha + \beta * AM_{t-1} + \gamma * SD_t + \delta * E_{t-1} + \theta * e^{\mu + \rho * D_{t-1}}1 \quad (2),$$

where:
AA=number of active accounts,
AM=number of active merchants,

T=time
D=distance from event in miles
E=vector of event dummies
SD=vector of seasonal dummies (months+holidays)

The coefficients in Equations (1) and (2) are determined in generating 806 the reference model formulas using the historical transaction data records. In this particular embodiment, the reference model employs event vector (e.g., occurrence vs. non-occurrence), distance from the event, seasonal vectors, and time to output a predicted number of active accounts and/or active merchants. It should be readily apparent that additional terms may be added and/or existing terms adjusted to account for additional and/or alternative variables, including location attributes, event types, temporary vs. permanent events, ongoing vs. one-time events, demographic variables, and/or any other variable.

Process 800 further includes determining 810 a predicted consumer spend within the target geographic area over the period of time associated with the candidate event by inputting the at least one of the predicted number of active accounts and the predicted number of active merchants into a predicted spend model. In the example embodiment of the predicted spend model, consumer spend in a particular geographic area is represented as a function of active accounts, active merchants, location (which may include one or more location attributes), and adjacent geographic areas. The latter two variables are, in the example embodiment, accounted for in the determination of predicted active accounts and/or active merchants. Accordingly, the predicted spend model may be simplified to, for example, an equation such as:

$$S_t = \alpha + \beta_1 * AA_t + \beta_2 * AM_t + \gamma * SD_t \quad (3),$$

where:
S=Consumer spend,
t=Time,
AA=Active Accounts Count,
AM=Active Merchants Count, and
SD=Vector of seasonal dummies (months+holidays).

In this particular embodiment, the predicted spend model employs active accounts, active merchants, and time to output a predicted consumer spend. It should be readily apparent that additional terms may be added and/or existing terms adjusted to account for additional and/or alternative variables.

Figure 9:
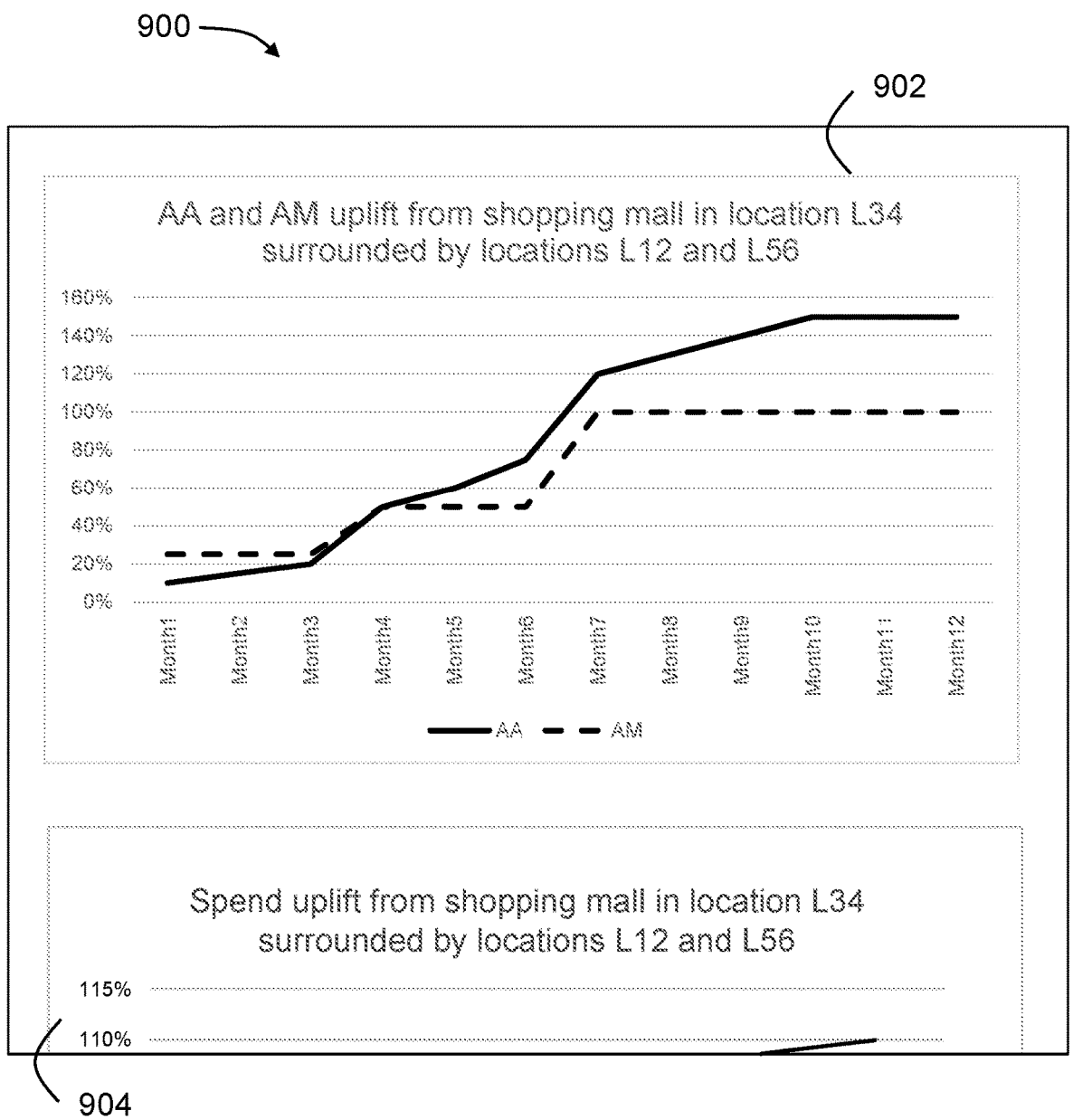
FIG. 9 illustrates an example economic impact report generated using the economic impact analysis system of FIGS. 2 and 3.

Process 800 also includes generating 812 an economic impact report for the requestor including at least the determined predicted consumer spend. FIG. 9 illustrates one example embodiment of an economic impact report 900. In some embodiments, economic impact report 900 is a physical (e.g., paper) report delivered to a requestor after being generated. In other embodiments, economic impact report 900 is an electronic report delivered to the requestor over a website or an application (e.g., via an API). In such embodiments, the requestor accesses economic impact report 900 using a client computing device (e.g., client system 204, shown in FIG. 2). In the illustrated embodiment, economic impact report 900 provides output from the reference model and/or the predicted spend model to the requestor. More specifically, economic impact report 900 includes a visual indicator 902 of the predicted number of active accounts (AA) and the predicted number of active merchants (AM) in a target geographic area (L34) after the occurrence of a candidate event (construction of a shopping mall). In the illustrated embodiment, visual indicator 902 includes a plot or chart. In any other embodiment, visual indicator 902 includes additional and/or alternative elements, such as table(s), description(s), diagram(s), flow chart(s), etc. In addition, economic impact report 900 includes a visual indicator 904 (partially shown in FIG. 9) of the predicted consumer spend for the target geographic area, based upon the predicted number of active accounts and active merchants, as described herein.

Process 800 may include additional, fewer, and/or alternative steps than those shown in FIG. 8. For example, in some embodiments, process 800 includes determining at least one of a predicted number of active accounts and a predicted number of active merchants within at least one geographic area adjacent to the target geographic area during the period of time associated with the candidate event by analyzing historical transaction data records (e.g., stored in the reference data store) of financial transactions occurring in geographic areas adjacent to the reference geographic area(s) in which the reference events occurred. Process 800 may further include determining a predicted consumer spend for the adjacent geographic area(s) based upon the predicted number of active merchants and/or active accounts. Moreover, it should be understood that the order of the steps of process 800 illustrated in FIG. 8 is illustrative only and non-limiting. The steps of process 800 may be performed in an order other than that shown and described herein.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for modelling a predicted economic effect of a candidate event occurring within a target geographic area using historical transaction data, the candidate event expected to have an economic effect on a local economy of the target geographic area, the method implemented using an economic impact analyzing computing device, the method comprising:

receiving, from a requestor, an area identifier representing the target geographic area and an event type identifier representing an event type of a candidate event to occur within the target geographic area;

identifying a plurality of comparable geographic areas that are each similar to the target geographic area based on at least one of a population size or a size of a local economy of the respective comparable geographic area;

building, at a database in communication with the economic impact analyzing device, a reference data store, the reference data store including historical transaction data records of payment transactions occurring in the plurality of comparable geographic areas and the target geographic area;

identifying, from the plurality of comparable geographic areas, a plurality of reference geographic areas and a plurality of non-reference geographic areas, wherein each reference geographic area has experienced a reference event having the same event type identifier as the candidate event and wherein each non-reference geographic area has not experienced a reference event having the same event type identifier as the candidate event;

training a reference model using the historical transaction data records in the reference data store as training sets, wherein output from the trained reference model includes at least one of a reference number of active card payment accounts and a reference number of active merchants within each of the reference geographic areas during a period of time associated with the reference event occurring in the corresponding reference geographic area, the period of time including a first amount of time before the reference occurred and a second period of time after the reference event occurred, and within each of the non-reference geographic areas during a corresponding period of time;

executing the trained reference model using inputs including the area identifier, the event type identifier, and a period of time associated with the candidate event, wherein the trained reference model outputs at least one of a predicted number of active card payment accounts and a predicted number of active merchants within the target geographic area during the period of time associated with the candidate event;

determining a predicted consumer spend within the target geographic area over the period of time associated with the candidate event by inputting the at least one of the predicted number of active accounts and the predicted number of active merchants into a predicted spend model, wherein the predicted consumer spend is an amount of money consumers are predicted to spend within the target geographic area; and generating an economic impact report for the requestor including the determined predicted consumer spend and the at least one of the predicted number of active card payment accounts and the predicted number of active merchants as a representation of the predicted economic effect of the candidate event on the target geographic area.

2. The method of claim 1, wherein building a reference data store comprises storing historical transaction data records, each historical transaction data record including a time of the respective payment transaction, a geographic location of the payment transaction, an account identifier of a card payment account associated with the payment transaction, a merchant identifier of a merchant associated with the payment transaction, and a transaction amount of the payment transaction.

3. The method of claim 1, wherein building a reference data store comprises:

storing a plurality of historical transaction data records in a transaction database; and retrieving a subset of the plurality of historical transaction data records based upon the received event type identifier, wherein the subset of the plurality of historical transaction data records includes transaction data records of payment transactions conducted in one of the plurality of reference geographic areas during the respective period of time associated with the respective reference event occurring in the corresponding reference geographic area and transaction data records of payment transaction conducted in one of the plurality of non-reference geographic areas during the corresponding period of time.

4. The method of claim 1, wherein determining at least one of a predicted number of active card payment accounts and a predicted number of active merchants within the target geographic area during a period of time associated with the candidate event further comprises inputting a length of the period of time into the trained reference model.

5. The method of claim 1 further comprising determining at least one of a predicted number of active card payment accounts and a predicted number of active merchants within at least one geographic area adjacent to the target geographic area during the period of time associated with the candidate event, wherein said determining comprises:

building the reference data store to include historical transaction data records of payment transactions occurring in a respective plurality of additional geographic areas adjacent to the plurality of reference geographic areas; and re-training the reference model using the historical transaction data in the reference data store.

6. The method of claim 1, wherein generating an economic impact report comprises generating the economic impact report including at least one visual indicator of the determined predicted consumer spend.

7. The method of claim 6, wherein generating the economic impact report further comprises generating the economic impact report including at least one visual indicator of the at least one of predicted number of active card payment accounts and predicted number of active merchants.

8. The method of claim 1, wherein building a reference data store comprises:

storing a plurality of historical transaction data records in a transaction database;
building an event table associating a plurality of reference events with corresponding reference geographic areas and reference event dates;
identifying a subset of the plurality of reference events having the received event type identifier; and
retrieving a subset of the plurality of historical transaction records based upon the identified subset of the plurality of reference events, the subset of the plurality of historical transaction records including transaction records of payment transactions occurring in reference geographic areas associated with the identified subset of the plurality of reference events during the period of time associated with the corresponding reference event.

9. An economic impact analyzing computing device for modelling a predicted economic effect of a candidate event occurring within a target geographic area using historical transaction data, the candidate event expected to have an economic effect on a local economy of the target geographic area, the economic impact analyzing computing device comprising a processor in communication with a memory, the economic impact analyzing computing device configured to:
receive, from a requestor, an area identifier representing the target geographic area and an event type identifier representing an event type of a candidate event to occur within the target geographic area;
identify a plurality of comparable geographic areas that are each similar to the target geographic area based on at least one of a population size or a size of a local economy of the respective comparable geographic area;
build, at a database in communication with the economic impact analyzing device, a reference data store, the reference data store including historical transaction data records of payment transactions occurring in the plurality of comparable geographic areas and the target geographic area;
identify, from the plurality of comparable geographic areas, a plurality of reference geographic areas and a plurality of non-reference geographic areas, wherein each reference geographic area has experienced a reference event having the same event type identifier as the candidate event and wherein each non-reference geographic area has not experienced a reference event having the same event type identifier as the candidate event;
train a reference model using the historical transaction data records in the reference data store as training sets, wherein output from the trained reference model includes at least one of a reference number of active card payment accounts and a reference number of active merchants within each of the reference geographic areas during a period of time associated with the reference event occurring in the corresponding reference geographic area, the period of time including a first amount of time before the reference occurred and a second period of time after the reference event occurred, and within each of the non-reference geographic areas during a corresponding period of time;
execute the trained reference model using inputs including the area identifier, the event type identifier, and a period of time associated with the candidate event, wherein the trained reference model outputs at least one of a predicted number of active card payment accounts and a predicted number of active merchants within the target geographic area during the period of time associated with the candidate event;
determine a predicted consumer spend within the target geographic area over the period of time associated with the candidate event by inputting the at least one of the predicted number of active accounts and the predicted number of active merchants into a predicted spend model, wherein the predicted consumer spend is an amount of money consumers are predicted to spend within the target geographic area; and
generate an economic impact report for the requestor including the determined predicted consumer spend and the at least one of the predicted number of active card payment accounts and the predicted number of active merchants as a representation of the predicted economic effect of the candidate event on the target geographic area.

10. The economic impact analyzing computing device of claim 9, wherein each historical transaction data record includes a time of the respective payment transaction, a geographic location of the payment transaction, an account identifier of a card payment account associated with the payment transaction, a merchant identifier of a merchant associated with the payment transaction, and a transaction amount of the payment transaction.

11. The economic impact analyzing computing device of claim 9, wherein the economic impact analyzing computing device is further configured to:
store a plurality of historical transaction data records in a transaction database; and
retrieve a subset of the plurality of historical transaction records based upon the received event type identifier, wherein the subset of the plurality of historical transaction data records includes transaction data records of payment transactions conducted in one of the plurality of reference geographic areas during the respective period of time associated with the respective reference event occurring in the corresponding reference geographic area and transaction data records of payment transaction conducted in one of the plurality of non-reference geographic areas during the corresponding period of time.

12. The economic impact analyzing computing device of claim 9, wherein the economic impact analyzing computing device is further configured to determine the at least one of the predicted number of active card payment accounts and the predicted number of active merchants within the target geographic area during a period of time associated with the candidate event further by inputting a length of the period of time into the trained reference model.

13. The economic impact analyzing computing device of claim 9, wherein the economic impact analyzing computing device is further configured to determine at least one of a predicted number of active card payment accounts and a predicted number of active merchants within at least one geographic area adjacent to the target geographic area during the period of time associated with the candidate event by:
building the reference data store to include historical transaction data records of payment transactions occurring in a respective plurality of additional geographic areas adjacent to the plurality of reference geographic areas; and
re-training the reference model using the historical transaction data in the reference data store.

14. The economic impact analyzing computing device of claim 9, wherein the economic impact report further includes at least one visual indicator of the determined predicted consumer spend.

15. The economic impact analyzing computing device of claim 14, wherein the economic impact report further includes at least one visual indicator of the at least one of predicted number of active card payment accounts and predicted number of active merchants.

16. The economic impact analyzing computing device of claim 9, wherein the economic impact analyzing computing device is further configured to build the reference data store by:
  storing a plurality of historical transaction data records in a transaction database;
  building an event table associating a plurality of reference events with corresponding reference geographic areas and reference event dates;
  identifying a subset of the plurality of reference events having the received event type identifier; and
  retrieving a subset of the plurality of historical transaction records based upon the identified subset of the plurality of reference events, the subset of the plurality of historical transaction records including transaction records of payment transactions occurring in reference geographic areas associated with the identified subset of the plurality of reference events during the period of time associated with the corresponding reference event.

17. A non-transitory computer-readable storage medium including computer-executable instructions embodied thereon, wherein when executed by an economic impact analyzing computing device including a processor in communication with a memory, the computer-executable instructions cause the economic impact analyzing computing device to:
  receive, from a requestor, an area identifier representing a target geographic area and an event type identifier representing an event type of a candidate event to occur within the target geographic area, the candidate event expected to have an economic effect on a local economy of the target geographic area;
  identify a plurality of comparable geographic areas that are each similar to the target geographic area based on at least one of a population size or a size of a local economy of the respective comparable geographic area;
  build, at a database in communication with the economic impact analyzing device, a reference data store, the reference data store including historical transaction data records of payment transactions occurring in the plurality of comparable geographic areas and the target geographic area;
  identify, from the plurality of comparable geographic areas, a plurality of reference geographic areas and a plurality of non-reference geographic areas, wherein each reference geographic area has experienced a reference event having the same event type identifier as the candidate event and wherein each non-reference geographic area has not experienced a reference event having the same event type identifier as the candidate event;
  train a reference model using the historical transaction data records in the reference data store as training sets, wherein output from the trained reference model includes at least one of a reference number of active card payment accounts and a reference number of active merchants within each of the reference geographic areas during a period of time associated with the reference event occurring in the corresponding reference geographic area, the period of time including a first amount of time before the reference occurred and a second period of time after the reference event occurred, and within each of the non-reference geographic areas during a corresponding period of time;
  execute the trained reference model using inputs including the area identifier, the event type identifier, and a period of time associated with the candidate event, wherein the trained reference model outputs at least one of a predicted number of active card payment accounts and a predicted number of active merchants within the target geographic area during the period of time associated with the candidate event;
  determine a predicted consumer spend within the target geographic area over the period of time associated with the candidate event by inputting the at least one of the predicted number of active accounts and the predicted number of active merchants into a predicted spend model, wherein the predicted consumer spend is an amount of money consumers are predicted to spend within the target geographic area; and
  generate an economic impact report for the requestor including the determined predicted consumer spend and the at least one of the predicted number of active card payment accounts and the predicted number of active merchants as a representation of the predicted economic effect of the candidate event on the target geographic area.

18. The non-transitory computer-readable storage medium of claim 17, wherein the computer-executable instructions further cause the economic impact analyzing computing device to:
  store a plurality of historical transaction data records in a transaction database; and
  retrieve a subset of the plurality of historical transaction records based upon the received event type identifier, wherein the subset of the plurality of historical transaction data records includes transaction data records of payment transactions conducted in one of the plurality of reference geographic areas during the respective period of time associated with the respective reference event occurring in the corresponding reference geographic area and transaction data records of payment transaction conducted in one of the plurality of non-reference geographic areas during the corresponding period of time.

19. The non-transitory computer-readable storage medium of claim 17, wherein the computer-executable instructions further cause the economic impact analyzing computing device to determine the at least one of the predicted number of active card payment accounts and the predicted number of active merchants within the target geographic area during a period of time associated with the candidate event further by inputting a length of the period of time into the trained reference model.

20. The non-transitory computer-readable storage medium of claim 17, wherein the computer-executable instructions further cause the economic impact analyzing computing device to determine at least one of a predicted number of active card payment accounts and a predicted number of active merchants within at least one geographic area adjacent to the target geographic area during the period of time associated with the candidate event by:
  building the reference data store to include historical transaction data records of payment transactions occurring in a respective plurality of additional geographic areas adjacent to the plurality of reference geographic areas; and re-training the reference model using the historical transaction data in the reference data store.

\* \* \* \* \*